United States Patent [19]

Coker

[11] 4,131,581
[45] Dec. 26, 1978

[54] ADHESIVE COMPOSITIONS CONSISTING ESSENTIALLY OF A VINYL ALCOHOL POLYMER, A CRYSTALLINE SOLVENT AND A VISCOSITY REDUCING DILUENT

[75] Inventor: James N. Coker, Wilmington, Del.

[73] Assignee: E. I. Du Pont de Nemours and Company, Wilmington, Del.

[21] Appl. No.: 777,321

[22] Filed: Mar. 14, 1977

Related U.S. Application Data

[63] Continuation-in-part of Ser. No. 749,986, Dec. 13, 1976, abandoned, which is a continuation-in-part of Ser. No. 640,782, Dec. 15, 1975, abandoned.

[51] Int. Cl.$^2$ .............................................. C08L 29/04
[52] U.S. Cl. ..................... 260/29.1 R; 260/29.6 RW; 260/29.6 WB; 260/29.6 B; 260/29.6 BE; 260/30.8 DS; 260/32.6 R; 260/33.4 R; 428/507; 428/511
[58] Field of Search ................... 260/29.6 B, 29.6 BE, 260/30.8 DS, 32.6 R, 33.4 R, 29.1 R, 29.6 RW, 29.6 WB; 428/507, 511

[56] References Cited

U.S. PATENT DOCUMENTS

| | | | |
|---|---|---|---|
| 3,250,748 | 5/1966 | Suzumura et al. | 260/29.6 B |
| 3,272,675 | 9/1966 | Suzumura et al. | 260/29.6 B |
| 3,313,637 | 4/1967 | Schneider | 264/221 A |
| 3,324,065 | 6/1967 | Pierce | 260/29.6 B |
| 3,374,195 | 3/1968 | Bianco et al. | 260/29.6 BE |
| 3,481,886 | 12/1969 | Lawes | 260/29.6 B |
| 3,632,786 | 1/1972 | Nickerson | 260/29.6 BE |
| 3,654,247 | 4/1972 | Bristol | 260/29.6 B |
| 3,925,289 | 12/1975 | Sakato et al. | 260/29.6 B |
| 3,931,088 | 1/1976 | Sakurada et al. | 260/29.6 B |

Primary Examiner—M. J. Welsh

[57] ABSTRACT

Adhesives consisting essentially of polyvinyl alcohol or ethylene/vinyl alcohol copolymer, a crystalline solvent for the polymer component (such as urea, thiourea, acetamide, ammonium formate, etc.) and a viscosity reducing diluent (such as water, glycols, etc.) are disclosed. The adhesives are particularly suitable for cellulosic substrates and provide excellent ambient temperature water resistance while being fully repulpable in hot water.

45 Claims, No Drawings

ADHESIVE COMPOSITIONS CONSISTING ESSENTIALLY OF A VINYL ALCOHOL POLYMER, A CRYSTALLINE SOLVENT AND A VISCOSITY REDUCING DILUENT

CROSS-REFERENCE TO RELATED APPLICATION

This is a continuation-in-part of application Serial No. 749,986, filed Dec. 13, 1976, which is a continuation-in-part of application Serial No. 640,782, filed Dec. 15, 1975, both of which are now abandoned.

BACKGROUND OF THE INVENTION (1) Field of the Invention

This invention relates to polyvinyl alcoholbased compositions and more particularly to adhesives containing polyvinyl alcohol or ethylene/vinyl alcohol copolymer, a crystalline solvent for the polymer and a viscosity reducing diluent.

(2) Description of the Prior Art

Japanese Patent Publication No. 12851/72 describes the preparation of shaped articles of polyvinyl alcohol. The process involves the preparation of an up to 20 percent by weight aqueous polyvinyl alcohol solution and the addition of 5-55 percent by weight, based on the weight of the aqueous solution, of urea thereto. Thereafter, uniform stress is applied to the aqueous solution by mechanical stirring. The polyvinyl alcohol/water/urea blend employed in this process contains 0.1 to 19 percent polyvinyl alcohol, 55 to 95 percent water and 5 to 36 percent urea, all based on the total weight of the solution. The shaped articles prepared by this process are disclosed to be useful as highly tenacious nonwoven fabrics, as fluff for mattress wadding or as filaments obtained by splitting the shaped article. There is no disclosure of the suitability of either the aqueous solutions or the shaped articles as adhesives.

U.S. Pat. No. 3,313,637 discloses models which may be separated readily from their molds. The models consist of a major portion by weight of a finely divided crystalline material (such as urea), a minor portion by weight of a finely divided organic material (such as polyvinyl alcohol) and a liquid solvent for the crystalline material (such as water). Example 1 discloses the use of a composition comprising 85 percent urea, 10 percent polyvinyl alcohol and 5 percent water. There is no disclosure whatsoever of adhesive use generally or as a hot melt adhesive specifically; on the contrary, it is emphasized that the model after pressing can be readily extracted from the matrix in which it was formed.

SUMMARY OF THE INVENTION

According to the present invention there is provided an adhesive composition consisting essentially of about 2 to 35 percent by weight of a polymer selected from the group consisting of polyvinyl alcohol and ethylene/vinyl alcohol copolymers containing at least 50 mol percent vinyl alcohol, about 10 to 80 percent by weight of at least one solvent for said polymer, which solvent is crystalline at 40° C. and is selected from the group consisting of urea, solid alkyl substituted ureas containing a total of up to 9 carbon atoms, thiourea, biuret, ε-caprolactam, solid aliphatic amides containing up to 6 carbon atoms, solid polyhydric compounds and ammonium carboxylate salts, about 5 to 80 percent by weight of at least one viscosity reducing diluent selected from the group consisting of water, liquid polyhydric compounds, liquid alkyl substituted ureas having up to 9 carbon atoms in the alkyl group, liquid aliphatic amides containing up to 6 carbon atoms, and dimethyl sulfoxide, and 0 to about 60 percent by weight extender selected from the group consisting of starch, dextrin, clay, silica, carbon black, talc, calcium carbonate, barium sulfate and vinyl polymer latices, provided that when the viscosity reducing diluent is present in an amount of above 45 percent by weight the adhesive composition is a suspension and the polymer is polyvinyl alcohol which has been subjected to a heat treatment at a temperature of 70° C.–190° C. dispersed in a liquid solvent comprising 42–100% by weight of methanol, 0–13% by weight of water, and 0–45% by weight of a solvent from the group consisting of 2 to 5 carbon monohydric alcohols, esters, ketones, ethers, hydrocarbons and chlorohydrocarbons in which said polyvinyl alcohol is insoluble, to reduce the cold water solubles content of said polyvinyl alcohol while maintaining its solubility in 80° C.–100° C. water.

According to the present invention there are further provided structures comprising cellulosic substrates bonded together by means of the adhesive composition of this invention.

In the context of the present invention the phrase "consisting essentially of" means that only unspecified ingredients which do not materially affect the basic and novel characteristics of the present invention can be included in the adhesive composition. Such ingredients, e.g., can be wetting agents, curing agents, etc.

DETAILED DESCRIPTION OF THE INVENTION

Adhesives based upon polyvinyl alcohol (PVA) and ethylene/vinyl alcohol (E/VOH) copolymers containing at least 50 mole percent VOH, which adhesives can be applied by conventional coating, spraying or hot melt techniques have been developed by the present invention. These compositions, which may or may not be homogeneous, constitute several new types of adhesive systems for bonding cellulosic materials. All of the adhesive compositions contain at least the polymer, a crystalline solvent for the polymer and a viscosity reducing diluent.

A variety of auxiliary extenders, such as starch, dextrin, clay, silica, carbon black, talc, calcium carbonate, barium sulfate, as well as vinyl polymer latices (such as polyvinyl acetate emulsion and vinyl acetate/ethylene copolymer emulsion) and also mixtures of these materials can be incorporated into the adhesive blends to achieve a broad range of application and adhesive properties.

The polymer component functions as the binder, contributing to adhesive bond strength and water resistance. The crystalline solvent for the polyvinyl alcohol or ethylene/vinyl alcohol functions as a solvent for the polymer when compositions of the present invention are prepared as hot melt adhesives. It also acts as a viscosity depressant, and imparts "set" or "quick tack" to some of the compositions described later. When compositions are applied as hot melts the viscosity reducing diluent's role is as a viscosity and melt point depressant and as such it enhances the molten adhesive's handleability and melt stability.

The adhesive compositions described herein may be prepared in a variety of ways so that they can be applied to cellulosic materials over a broad temperature range depending on the physical form of the adhesive. Specifically, adhesive compositions can be applied from room temperature (about 20° C.) to as high as 135° C., or any temperature in between.

When used as a molten or hot melt adhesive the composition of the present invention is homogeneous and undergoes rapid "set" upon cooling. This "set" characteristic results in "quick tack" performance, which is a unique feature of the molten, homogeneous adhesive system of the present invention, contrasting sharply with conventional polyvinyl alcohol adhesives which, upon cooling, give weak, non-tacky bonds. "Tack" is defined by Skeist (Ref. Handbook of Adhesives, p. 63, Reinhold, 1962) as the "stickiness" an adhesive exhibits giving it the ability to adhere upon contact. When the adhesive has this characteristic to a high degree it is said to have "quick tack". For the purpose of this discussion "quick tack" is defined as the time in seconds required for the adhesive to develop a fiber-tearing bond to a cellulosic substrate in a standard T-peel test. For a corrugating or case sealing adhesive a "quick tack" of 1–3 seconds is the preferred range with a 0.5–10 second range being acceptable. The molten homogeneous adhesives systems of this invention exhibit quick tack falling within the acceptable range. Adhesives containing urea or thiourea as the principal crystalline solvent for the polymer exhibit "quick tack" falling within the preferred range.

The molten homogeneous adhesives of the present invention can be distinguished readily from blends containing only one of the two essential solvent and diluent components (i.e., ones that contain only the crystalline solvent or the viscosity reducing diluent). Such two component systems are characterized by very poor melt stability (for example, PVA/urea blends), excessive and unstable application viscosities (e.g., PVA/urea or PVA/thiourea blends), and failure to "set" by crystallization upon cooling (e.g., PVA/water or PVA/N-methyl pyrrolidone blends). Similarly, solutions containing 20 percent or more by weight of polyvinyl alcohol in conventional solvents (e.g., water, dimethyl sulfoxide, N-methyl pyrrolidone) exhibit excessively high viscosities and are highly prone to undergo gelation upon cooling.

When the adhesive blends described above are kept in the molten state, usually at 100° C.–135° C., for extended periods of time storage in tightly covered containers is recommended to prevent loss of viscosity reducing diluent. If excessive loss of diluent occurs, the melt can become progressively more aerated due to the evolution of ammonia resulting from the reaction of polyvinyl alcohol and urea as the temperature increases.

Adhesive blends can be prepared which are not homogeneous melts and which can be applied by conventional coating techniques at lower temperatures, i.e. in the range of 40° C.–80° C., then employed when molten homogeneous compositions are used. These adhesive blends are viscous systems (up to 20,000 cps at 70° C.) and contain extender as an additional component. Generally they are lower in viscosity than the molten homogeneous systems described above. Solutions of only polymer, i.e. polyvinyl alcohol in the diluent (e.g. water) at about 20 percent or more polymer by weight would be excessively high in viscosity. In the heterogeneous adhesive blends of this invention the crystalline solvent functions as a viscosity depressant to overcome the high viscosity which occurs when it is not present. These heterogeneous systems do not develop "set" or "quick tack" as rapidly as do the molten homogeneous compositions, but do give fiber tearing, water resistant bonds when set. Full advantage of adhesive capability is realized when the viscosity reducing diluent, usually water, is removed, after application of the adhesive, either by evaporation or heating as is the case with many existing solvent containing adhesive systems. These systems also are considerably lower in cost than current polyvinyl alcohol adhesives.

Another embodiment of the present invention employs an especially preferred type of polyvinyl alcohol which has been heat treated at a temperature of 70° C. to 190° C. as a dispersion in methanol and optionally water and 2–5 carbon monohydric alcohols, esters, ketones, ethers, hydrocarbons and chloro-hydrocarbons in which the polyvinyl alcohol is insoluble, in order to increase its crystallinity as reflected by a reduction in cold water solubility. This type of polyvinyl alcohol has a cold water solubles content of less than 10% by weight at 25° C. while maintaining its solubility in 80° C.–100° C. water. A more detailed description of such polyvinyl alcohol products and of the method of treatment employed to obtain them can be found in Bristol U.S. Pat. No. 3,654,247, the disclosure of which patent is hereby incorporated by reference. Polyvinyl alcohol suitable for use in this embodiment can also be obtained by heat treatment at a temperature of at least 50° C. as a dispersion in a treating liquid comprising a 2 to 20 weight percent solution of acetic acid in a solvent comprising methanol or methyl acetate or a mixture of methanol and methyl acetate. A more detailed description of such polyvinyl alcohol products and of the method of treatment employed to obtain them can be found in Bristol U.S. Pat. No. 3,487,487.

Using this type of polyvinyl alcohol heterogeneous adhesive systems can be prepared which are low viscosity (up to 2000 cps at 70° C.), stable suspensions and can be stored in this state at room temperature for long periods of time. These systems are suspensions of finely divided polyvinyl alcohol in a solution of the crystalline solvent (preferably urea) in the viscosity reducing diluent (preferably water). The finely divided PVA used in this system will remain suspended for a considerable period of time after its initial dispersion during preparation. Continued stable suspension during use can be maintained by a minimum of agitation, such as mild stirring or during periods of flow or pumping. Use of hydrocolloid, such as guar gum, aids suspension and/or redispersion during periods of static storage, for example, overnight storage. The resultant suspension may be applied from room temperature (about 20° C.) to about 60° C. to cellulosic materials by conventional methods including spraying, roll coating, doctor blade or any other emulsion coating technique. Applied by these methods the adhesive composition adheres firmly to the cellulosic material as a coating when air dried and as such may be stored indefinitely until its bonding capability is activated by further heating. In this form the adhesive compositions of the present invention are characterized as heat activatable systems.

Except for the requirement of employing the specially treated polyvinyl alcohol above referred to in the activatable low viscosity, stable suspension embodiment of the adhesive compositions of the present invention all commercial grades or polyvinyl alcohol tested were found to be operable as blend components. These grades include both completely hydrolyzed (i.e., about 99 percent or higher) and partially hydrolyzed (about 88 percent) types covering a degree of polymerization (DP) range of about 300–2000 (number average basis), as well as fully hydrolyzed copolymers of polyvinyl alcohol (including ones containing about 4 percent methyl methacrylate comonomer) of similar DP range. The viscosity measured at 20° C. using a 4 percent aqueous solution) of the polyvinyl alcohols tested in the blends ranged from about 4 to about 65 cps. Preferably the viscosity should be from about 10 to about 65 cps.

The polyvinyl alcohol preferred as a component in the adhesive under discussion whether treated according to Bristol U.S. Pat. No. 3,654,247, or not is a 99 percent hydrolyzed grade with a DP of 800 and a 4 percent aqueous viscosity (20° C.) of 12-14 cps. The E/VOH copolymers suitable in the blends of the present invention contain at least about 50 mole percent VOH units.

The amount of polyvinyl alcohol or E/VOH copolymer in the blends of the present invention can range between about 2 and 35 percent by weight. In the molten homogeneous systems of the present invention about 10 to 35 percent by weight polyvinyl alcohol should be present. The use of such amounts of polymer provide strong bonds in the dry state. In the viscous heterogeneous embodiment of the present invention, about 5 to 25 percent by weight of polymer should be employed. Polymer levels below about 5% do not have sufficient adhesive capability for satisfactory bonding whereas blends containing above about 25% are too viscous for satisfactory handling and application of adhesives to substrates. Low viscosity, stable suspension can be made according to the present invention with about 2 to 35 percent by weight polyvinyl alcohol. Levels of polymer below about 2% do not result in water resistant bonds whereas concentrations above about 35% are not only economically unattractive but have a tendency to diminish suspension characteristics and result in a pasty consistency.

The adhesives of the present invention exhibit excellent ambient water resistance while remaining fully repulpable in hot water. Ambient temperature water resistance was measured by the ply separation test, ASTM-D 1028. Accordingly, they are suitable, when used as a hot melt, where lower cost wax free systems are called for. They are suitable for bonding cellulosic substrates under wet ambient conditions. As such, they can be used as corrugating adhesives. When used in the form of a low viscosity, stable suspension they are suitable as low-cost post-activatable carton and case sealing adhesives. In these systems fiber tearing bonds can be realized if the polymer concentration in the adhesive blend is 2 percent or higher (calculated on a dry weight basis).

High humidity performance, determined by aging bonded structures at 90percent relative humidity for 1–2 weeks, was found to be excellent. For example, fiber tearing bonds were observed in tests with conditioned board samples prepared with the molten homogeneous adhesive containing 20 percent of PVA (calculated on a dry weight basis). Bonded structures prepared with the low viscosity, stable suspension type adhesive, containing as little as 2 percent of the PVA described in the Bristol patent, yielded fiber tearing bonds after submersion in water for at least 24 hours.

The crystalline solvent for the polymer component must satisfy the following requirements: (1) it must be crystalline at 40° C., (2) it must function as solvent for the polymer, i.e., dissolve at least 5 weight percent of the latter at or above the melting point of such solvent, and (3) it must be miscible with the viscosity reducing diluent. The following compounds were found to satisfy these conditions: (1) urea; solid alkyl substituted ureas containing a total of up to 9 carbon atoms, such as methyl urea (m.p. 95° C.–98° C.), ethyl urea (m.p. 92° C.), 1,1-diethyl urea (m.p. 112° C.); thiourea; biuret, and ε-caprolactam; (2) solid aliphatic amides containing up to 6 carbon atoms such as acetamide, propionamide, butyramide; (3) solid polyhydric compounds such as pentaerythritol, sorbitol, mannitol and tris (hydroxymethyl) aminomethane; and (4) ammonium carboxylate salts such as ammonium formate. In the above context "solid" means that the specified compound is in the solid state at 20° C.

Urea is the most preferred crystalline solvent for the polymer primarily because of its less hygroscopic nature and because its melting point (132° C.) falls within the preferred range of 75° C.–175° C. ε-Caprolactam is also a preferred crystalline solvent. Thiourea is also preferred although it has a tendency to corrode stainless steel equipment.

The crystalline solvent for the polymer should be present in an amount of about 10–80 percent by weight. Below this range the products tend to be too viscous and have poor "tack" while concentrations above 80 percent have a detrimental effect on the ambient temperature water resistance of the obtainable bonds.

The amount of crystalline solvent in the various embodiments of the present invention is as follows: about 40–80 percent by weight in the molten homogeneous blends, about 10–45 percent by weight in the viscous heterogeneous blends and about 15–68 percent by weight in the low viscosity stable suspension.

In addition to the binder polymer and the crystalline solvent therefor, adhesive blends of the present invention contain a viscosity reducing diluent which is fully compatible regardless of the state of the adhesive blend, i.e. molten homogeneous form, viscous heterogeneous form or as a low viscosity stable suspension. When used with molten homogeneous or viscous heterogeneous blends "viscosity reducing diluent" means that this component reduces the viscosity of the blend, i.e. that the viscosity of a molten blend containing the polymer, crystalline solvent for the polymer, and the viscosity reducing diluent, measured at a temperature from about 90° C. to about 135° C., is lower than the viscosity of a blend containing the same amount of polymer and crystalline solvent without any diluent being present, measured at the same temperature. When used with low viscosity, heterogeneous suspensions containing PVA described in Bristol U.S. Pat. No. 3,654,247 the "viscosity reducing diluent" functions as a carrier to facilitate application of the polymer and crystalline solvent into the cellulosic substrate. In contrast to the restricted number of compounds suitable as the crystalline solvent for the polymer, a relatively broad range of materials can be used as the viscosity reducing diluent. A primary requirement is that such diluents be relatively non-reactive in the blends. Another requirement is that the diluent be fully miscible in the blend although it does not have to be a solvent for the binder component by itself. Thus the viscosity reducing diluent can be water, liquid polyhydric compounds such as glycols having 2 to 9 carbon atoms, glycol ethers (wherein the acyl group contains 2 to 4 carbon atoms), lower molecular weight (up to a molecular weight of 1,000) polyalkylene oxides and their alkyl ethers (alkyl group containing 1 to 4 carbon atoms), polyalkylene oxide esters (wherein the acyl group contains 2 to 4 carbon atoms), liquid alkyl substituted ureas (having up to 9 carbon atoms in the alkyl group), such as tetramethyl urea and tetraethyl urea; liquid aliphatic amides containing up to 6 carbon atoms, such as formamide and dimethyl sulfoxide. The term "liquid" in this context means that the named compounds are in the liquid state at 20° C. Some solid diols also manifest a viscosity reducing effect. Water, ethylene glycol, propylene glycol, diethylene glycol, dipropylene glycol, triethylene glycol, dimethyl sulfoxide, and formamide are preferred viscosity reducing diluents.

These diluents should be present in an amount of about 5 to 80 percent by weight in the adhesive compositions of the present invention.

At viscosity reducing diluent concentrations of below about 5 percent, the melt is very gassy due to the evolution of ammonia resulting from the reaction of polyvinyl alcohol and urea. At viscosity reducing diluent concentrations of above about 80 percent, the adhesive does not develop green strength or fiber tearing properties as rapidly as desired.

The concentration of viscosity reducing diluent has a significant effect on the properties and characteristics of the different types of adhesive blends which can be prepared by the present invention. With homogeneous melts, viscosity reducing diluent concentrations of below 5 percent promotes the evolution of ammonia resulting from the reaction of polyvinyl alcohol and urea. At viscosity reducing diluent concentrations of above about 40 percent, the molten homogeneous adhesive blend does not develop green strength or fiber tearing properties as rapidly.

Molten homogeneous blends containing up to about 15 percent of water as the viscosity reducing diluent require handling temperatures of 115° C.–135° C. and need to be stored in tightly covered containers to prevent loss of water. If about 15–30 percent of water is present, the melt point of the blend is depressed to permit handling at about 90° C.–110° C. provided loss of water through evaporation is prevented. With melts containing more than about 30 percent of water handling at about 100° C. is simpler because of improved stability and lower viscosities but loss of water from these blends still should be minimized. Also, homogeneous blends containing more than about 30 percent of water generally do not develop green strength and fiber tearing bond and water resistance characteristics as do the lower water content homogeneous blends.

With the viscous heterogeneous blends of this invention handling temperatures of about 40° C.–80° C. can be realized. These application temperatures are desirable because the loss of viscosity reducing diluent can be further minimized. With this type of adhesive composition diluent concentrations below about 20 percent result in too high viscosity. On the other hand, viscosity reducing diluent concentrations above about 40 percent yield compositions having too low viscosity and such compositions do not have sufficient tackiness to function as adhesives.

With the low viscosity stable suspension type of adhesive compositions of this invention diluent concentration can vary from about 30 to about 80 percent. Below 30 percent concentration of viscosity reducing diluent there is not sufficient diluent (e.g. water) present to adequately dissolve the crystalline solvent or satisfactorily disperse the polymer binder, i.e. polyvinyl alcohol.

At above about 80 percent water concentration the subsequently post heat activatable adhesive is too runny to stick satisfactorily upon contact to the cellulosic substrate to which it is applied.

The homogeneous molten adhesive systems of the present invention can be prepared several ways as illustrated by the following. A dry blend consisting of, for example, 28 parts of Elvanol ® 90–50 (polyvinyl alcohol, degree of hydrolysis 99.0–99.8 percent, 4 percent aqueous viscosity 12–14 cps. at 20° C., available from E. I. du Pont de Nemours and Company) and 72 parts of urea pulverized through a 40 mesh screen is added with stirring to 35 parts of water, heated to 70° C.–85° C. The addition is carried out at a sufficiently slow rate to maintain a minimum temperature of 70° C. in the mixture and requires about ¼ to ½ hour. The blend is held at 85° C.–90° C. for an additional 15 minutes to obtain a high level of homogeneity. The resulting product is stable. No adverse effects were noted on the blend after storage for two days at the application temperature of 90° C.–95° C. provided that storage was in a covered container to prevent loss of water. A similar procedure can be employed to produce a molten homogeneous adhesive system wherein the viscosity reducing diluent is a glycol, (for example, propylene glycol) instead of water except that a blending temperature of 120° C.–130° C. is used and the product is applied at 110° C.–115° C. In the preparation of molten homogeneous adhesive systems of the present invention the polymer binder or binder and crystalline solvent components are added incrementally to the melt in order to prevent the formation of mixtures with excessive intermediate viscosities.

The molten homogeneous adhesives of the present invention (e.g., based on PVA, urea and water) provide the unexpected and desirable advantage of yielding bonds which can be made highly water resistant. The preferred method of accomplishing this is by "heat setting". For example, after being heated briefly, corrugated board prepared with the adhesive of this invention exhibits an enormous improvement in ambient temperature water resistance as measured by the dead load shear test. This test consists of mounting a 2 cm × 15 cm section of double faced board with the flutes running horizontally in water at ambient temperature under 350 g. (buoyancy corrected) dead load shear. In order to apply this shear force to only five flute sections (the test zone) the front liner was slit in the flute direction immediately above the test zone; likewise the back liner was cut just below the test zone. A "pass" in the test corresponded to the specimen supporting the 350 g. load for at least 24 hours. Board produced with a PVA/urea/water adhesive melt without "heat setting" fails in ½–2 minutes. With appropriate "heat setting" >85 percent of the specimens tested will pass the test. A number of methods for accomplishing "heat setting" of the bonded substrates have been developed. One method, which involves the direct application of heat to the bond through the face of the liner is illustrated in Example 8. Another involves contacting the sample with the surface of an infrared lamp until the temperature in the glue line reaches 212° F.; under these conditions 100 percent of the specimens passed the test. Still another procedure involves the use of radio-frequency energy. Employing a "radio frequency heater" (FMC Model 67, sold by W. T. Larose and Associates, Inc. of Cohoes, N.Y.), and operating at 40 megacycles under the following conditions, bonds are produced that pass the test without exception.

| Voltage | Exposure Time |
|---|---|
| 100 Volts | 25 sec. |
| 125 Volts | 10 sec. |
| 140 Volts | 5 sec. |
| 150 Volts | 5 sec. |
| 175 Volts | 2 sec. |
| 200 Volts | <2 sec. |

The incorporation of a variety of wetting agents has also been found to improve the water resistance of bonds prepared with the present adhesives used as a hot melt. In the absence of such wetting agents or if a post heat treatment is omitted, bond failure in the dead load shear test on occasion can be adhesive (i.e. between the bond and the paper). Incorporation of an appropriate wetting agent facilitates wet-out of the substrate by the adhesive; as a result the cohesive strength of the adhesive, which is of a high order even under water immersion conditions, becomes limiting and the incidence of survival of the bonds under water immersion conditions is increased significantly. Wetting agents found to be operable include sodium lauryl sulfate, polyethylene oxide-alkyl phenol adducts and their phosphate esters (e.g., "Triton" X-305 and "Triton" QS-9 available from Rohm & Haas), quaternary ammonium salts, various inorganic salts such as alkali phosphates, and sodium nitrilotriacetate. These materials are generally incorporated at about 1–5 percent level based on weight of adhesive. Use of a wetting agent has been found to reduce the severity of the post heat treatment required to produce bonds capable of surviving the ambient temperature water resistance test when adhesive blend is applied as a melt.

The incorporation of a latent curing agent is suggested that it is desired to obtain resistance to boiling water. Accordingly, a curing system of titanium citrate and glycollic or citric acid can be used. About 2 percent titanium citrate and about 2 to 4 percent of either glycollic or citric acid (per weight of adhesive) is suitable. The acid reduces the pH of the blend to 3.5–4.5 where it exhibits normal melt flow behavior. Curing can be accomplished by either contacting the bonded substrates with ammonia (aqueous or gaseous) or by heating them at a temperature above 160° C. for several minutes such that sufficient ammonia evolves from the adhesive to affect the curing reaction.

Another curing system developed for the molten adhesives of the present invention, wherein the liquid cosolvent is water, is based on resorcinol and formaldehyde. The preferred curing agent consists of 2 parts of resorcinol, 2 parts of urea and 3 parts of 37 percent formalin, which are converted into a resole by heating for 15 minutes at 90° C.–95° C. This resole, when incorporated into the adhesive at a 2–10 percent level (based on weight of adhesive), yielded bonds which after 14–21 days aging under ambient conditions developed sufficient water resistance to pass the dead load shear test.

The resole compositions based on resorcinol, urea and formalin can range in composition from 1:1:1 to 1:1:3 resorcinol/urea/formalin and can be employed over a concentration range of about 1–20 percent expressed in terms of the weight of the adhesive. In addition to aging at ambient temperature in a semidry state for 14–21 days, curing of such blends can be carried out by heating for several minutes at 120° C.–150° C.

The polyvinyl alcohol adhesive blends of the present invention containing urea as the crystallizable PVA solvent were found to be non-combustible, unable to support a flame in the vertical, relatively non-charring with little or no tendency to exhibit after-glow. However, at the levels employed, these materials do not reduce significantly the combustibility of cellulosic materials bonded by them unless they are used in conjunction with a known flame proofing agent such as ammonium sulfamate.

Viscous heterogeneous adhesive systems, suitable for use in the temperature range of 40° C.–80° C., can be prepared as follows. Fifty parts of urea are added to 70 parts of water and the solution is heated to 70° C. Twenty parts of Elvanol ® 90–50 is added with stirring at a uniform rate to the urea solution, maintaining the temperature at 70° C. Mixing is continued until the blend is uniform at 70° C., at which time 93 parts of finely divided calcium carbonate is added. Mixing is continued until the blend temperature is 70° C. The resulting heterogeneous blend is stable and may be stored for several days in a covered container at 40–80° C. with no loss in adhesive properties.

Low viscosity heterogeneous stable suspension type adhesive systems which can be post heat activated to obtain water resistant bonds may be prepared as follows. Forty parts of urea are added to forty parts of water at 25° C. resulting in a clear solution. Twenty parts of Elvanol ® 90–50 treated as described in Bristol USP 3,654,247 are dispersed in the urea solution. One tenth of one percent guar gum ("Jaguar" A40-F available from Stein, Hall and Company, Inc.) is then dissolved in the aqueous phase resulting in a suspension which remains stable for several days at room temperature.

The following examples are presented to illustrate, but not to restrict, the present invention. Percentages and parts are by weight unless otherwise stated. Examples 1 to 85 illustrate the molten homogeneous blend embodiment of the present invention.

EXAMPLE 1

A mixture of 400 g. of urea and 400 g. of water was placed in a Brabender mixer and was agitated. As soon as most of the urea dissolved, 200 g. of polyvinyl alcohol ("Elvanol" 90–50, degree of hydrolysis 99.0–99.8 percent, 4 percent aqueous viscosity 12–14 cps. at 20° C., available from E. I. du Pont de Nemours and Company) was added as rapidly as possible, producing a thin slurry. Heat was applied. As the temperature of the solution increased progressive thickening of the mixture was observed, its viscosity reaching a maximum of 40° C.–50° C. As heating was continued, the mixture thinned out, clarified and became quite fluid at a temperature of 80° C.–90° C. (Viscosity of about 2000 cps.); this operation required about 15–20 minutes. The mixture was placed in a polyethylene bag and chilled to below 5° C. to induce gelation. The gelled product was chopped and stored in a moisture-tight container to prevent loss of water.

EXAMPLE 2

Using a Cowles dissolver, 1500 g. of urea and 200 g. of water was heated to 125° C.–135° C. with agitation. To the molten mass was added 500 g. of polyvinyl alcohol ("Elvanol" 90–50) at as fast a rate as possible. Agitation was continued until the mixture was fully melted and had clarified. At this point it was poured onto "Teflon" sheeting where it immediately crystallized. The resulting slab was broken up and pulverized. The finely divided product was either used in this form or was compression molded into cartriges for application by hot melt gun. The product was stored in a moisture-tight container.

EXAMPLE 3

A 0.5-1.0 mil film of the adhesive composition of Example 2 was prepared between "Mylar" sheets by pressing in a heated Pasadena press. The film was frozen, one of the "Mylar" sheets was lifted and a piece of kraft paper inserted. Mild heat (90° C.-95° C.) and pressure (10-20 psig) was applied in the Pasadena press to bond the kraft paper and one side of the adhesive film. The structure was frozen again, the second sheet of "Mylar" was lifted, and a second piece of kraft paper inserted. The second sheet of kraft paper was then bonded in a Sentinel heat sealer using ½ second contact time, 70 psig pressure and a bar temperature of 135° C.-175° C. The laminate exhibited strong, fiber tearing bonds after soaking in ambient temperature water but underwent rapid delamination in water heated to about 70° C.

EXAMPLE 4

A 6" roll coater assembly equipped with a heated and jacketed pan was used for applying the melted adhesive to the applicator roll. This equipment was provided with a dual feed of kraft paper rolls such that a laminated structure could be produced. The experiment was carried out by first melting the adhesive composition of Example 1 in a separate jacketed reservoir and holding it at a temperature of about 85° C.-95° C. Once the paper feed had been started, operating at 20 ft./min., the melted adhesive ws pumped into the heated applicator pan at the rate at which it was applied to the paper. In this manner, a structure in which two sheets of kraft paper were bonded with 1-2 mil adhesive (dry basis) was produced. The adhesive could be applied smoothly without gaps and no undesirable adhesive build up occurred on the applicator roll as the run proceeded. At the completion of the experiment the equipment was cleaned up easily by hot water washing. The bonded structure exhibited excellent high humidity and ambient temperature water resistance. It was readily repulpable in hot water.

EXAMPLE 5

In this experiment a 25" corrugator was used with the applicator roll heated to 85° C. Approximately 1 pound of the blend of Example 1 was melted and was placed on this roll where it was quickly spread into a continuous coating on the roll by a doctor blade assembly. A single faced corrugated structure was passed over the roll at about 100 ft./min. such that the tips of the flutes were wetted by the adhesive. The second facing was then applied and the resulting structure passed through several pressure rolls before being cut about 10-12 feet down the line. The adhesive exhibited excellent rheology on the machine as long as its water content was maintained. Adequate "green strength" had developed in the structure by the time it reached the collector station and fiber tear was observed after the structure had been allowed to age 3-5 minutes. The corrugated structure exhibited little or no undesirable "ribbing" (in direct contrast to structures prepared with conventional corrugating adhesives). Equipment cleanup at the end of the trial was relatively simple due to the ease of removing adhesive build up from the applicator roll and also because of the ready solubility of the adhesive in hot water. Examination of the resulting corrugated structure indicated excellent performance for the adhesive. The dry pin adhesion (corrugated flute to liner bond) proved to be superior to starch (e.g., 85-100 lbs. vs. 50-70 lbs.) at about ½-⅔ the loading (e.g., 1.5 lbs. vs. 2.0-3.0 lbs. per 1000 ft.$^2$ board). The corrugated board bonded with the adhesive of this Example exhibited excellent ambient temperature water resistance in the ply separation test, fiber tear being observed after 10 days immersion. In contrast starch bonded structures delaminated after 1-2 minutes immersion. The polyvinyl alcohol-urea bonded structure was readily repulpable in hot water.

EXAMPLE 6

A 23/68/9 polyvinyl alcohol ("Elvanol" 90-50-)/urea/water blend, compression molded into 7/8" × 1¼" cylinders was applied using a conventional design hot melt gun. The material handled well over a 130° C.-150° C. temperature range exhibiting good quick tack on paper boards forming fiber tearing bonds within about 1-3 seconds. Upon cooling to below 100° C.-110° C. the bonds exhibited 100 percent fiber tear.

EXAMPLE 7

The blend of Example 2, in pulverized form, was placed in all LTI "Dynapply" 45D case sealing unit equipped with an LTI G-type 4-nozzle head. The material was melted at a temperature of 265° F.-300° F. and then applied by pumping through the nozzle assembly. The adhesive was applied to kraft paper and its adhesion and quick tack performance were noted. The molten adhesive was observed to form fiber tearing bonds upon contact with the kraft. The glue line appeared to have an open time of 1-3 seconds producing fiber tearing bonds in laminates almost as soon as the facing sheet was brought into contact with the adhesive-containing sheet. These bonds exhibited excellent ambient temperature water resistance but underwent delamination in water at 165° F. or higher.

EXAMPLE 8

A 2 cm × 12 cm section of corrugated board, bonded with an 18/47/35 "Elvanol" 90-50/urea/water blend and air-dried for several days, was used in the dead load shear test for water resistance. This section of board was heated for 30 seconds at 300° F. in a Pasadena press under light pressure and was subjected to the dead load shear test for ambient temperature water resistance. The sample survived >48 hours immersion under the test conditions. The results obtained by carrying out the heat setting under a variety of conditions are summarized in Table I.

Table I

| Heat Setting | | Incidence of Survival |
|---|---|---|
| Duration | Temperature[1] | >24 Hr.[2] |
| — | — | 0% |
| 2 hr. | 200° F. | 65% |
| 15 min. | 200° F. | 75% |
| 1 min. | 300° F. | 100% |
| 30 sec. | 320° F. | 70% |
| 1 sec. | 480° F. | 65% |
| ½ sec. | 570° F. | 35% |

Table I-continued

| Heat Setting | | Incidence of Survival |
|---|---|---|
| Duration | Temperature[1] | >24 Hr.[2] |
| ½ sec. | 680° F. | 70% |

[1]Temperature of surface against which outside of corrugated board was pressed for the time indicated.
[2]Based upon 6-8 samples having adhesive loadings ranging from 0.75-2.5 lb./1000 sq. ft. of corrugated board.

glycerine, which yielded a highly unstable melt, all of the other additives tested yielded blends which exhibited good-to-excellent overall bonding performance. The only deficiency picked up in the testing was the poorer water resistance of the resulting bonds in most cases. This deficiency is not expected to significantly reduce the utility of the blends of the present invention, e.g., in uses such as case sealing and book binding adhesives.

TABLE II

| | Blend Composition | | Performance on Regular Kraft | | | |
|---|---|---|---|---|---|---|
| Example | (wt. ratio) "Elvanol" 90-50/urea/"X" | "X" | Dry Bond | Quick Tack[1] (seconds) | Melt Stability[2] | Water Resistance[3] |
| 9 | 19/56/25 | Propylene Glycol | Fiber Tear | 1-2 | Excellent | Excellent |
| 10 | 19/56/25 | Ethylene Glycol | Fiber Tear | 1-2 | Good | Excellent |
| 11 | 19/56/25 | Triethylene Glycol | Fiber Tear | 2-3 | Good | Fair |
| 12 | 19/56/25 | Glycerine | Not Tested | Not Tested | Very Poor | Not Tested |
| 13 | 18/55/27 | Cellosolve | Fiber Tear | 2-3 | Good | Very Poor |
| 14 | 18/55/27 | Carbitol | Fiber Tear | 2-3 | Good | Very Poor |
| 15 | 18/55/27 | Butyl Cellosolve | Fiber Tear | 2-3 | Good | Very Poor |
| 16 | 20/59/21 | Carbitol Acetate | Fiber Tear | 2-3 | Good | Very Poor |
| 17 | 25/50/25 | Carbitol | Fiber Tear | 2-3 | Good | Very Poor |
| 18 | 25/50/25 | Cellosolve | Fiber Tear | 2-3 | Good | Very Poor |
| 19 | 25/50/25 | Butyl Cellosolve | Fiber Tear | 2-4 | Fair | Very Poor |
| 20 | 25/50/25 | Carbitol Acetate | Fiber Tear | 2-4 | Poor | Very Poor |
| 21 | 20/60/20 | Ethylene Glycol | Fiber Tear | 1-2 | Good | Excellent |
| 22 | 20/60/20 | Propylene Glycol | Fiber Tear | 1-2 | Excellent | Excellent |
| 23 | 20/60/20 | Diethylene Glycol | Fiber Tear | 2-3 | Good | Poor |
| 24 | 20/60/20 | Triethylene Glycol | Fiber Tear | 2-3 | Good | Poor |

[1]Time required for bond to "set" by crystallization.
[2]Excellent = little or no change after 24 hours at 95° C.; Good = slight increase in viscosity at 95° C.; Fair = moderate gassing accompanied by moderate viscosity change; Poor = phase separation; Very Poor = too unstable to test.
[3]Water resistance of 1" lap joints after 24 hours soak at 25° C.; Excellent = 100% fiber tear; Good = some fiber tear; Fair = no fiber tear and no delamination; Poor = partial delamination; Very Poor = rapid complete delamination.

EXAMPLES 9-24

Several blends containing various glycol and glycol ethers have been also examined. Both the melt characteristics and the bonding performance of these blends have been investigated. Results of this study are summarized in Table II. As will be noted, with the exception of

EXAMPLES 25-61

Molten homogeneous blends of the present invention and some comparative blends are further illustrated by the compositions and their characteristics summarized in Table III.

TABLE III

| | Blend Composition (wt. ratio) | | | | | Blend Characteristics | | Bonding Performance To Kraft | | |
|---|---|---|---|---|---|---|---|---|---|---|
| | Elvanol | Crystalline Solvent for the PVA | | Viscosity Reducing Diluent | | In Molten State | | | | Water |
| Example | 90-50 | Urea | Other | Water | Propylene Glycol | Other | Viscosity[1] | Melt Stability[2] | Quick Tack[3] | Dry Bond[4] | Resistance[5] |
| 25 | 20 | — | Thiourea (60) | — | 20 | — | Moderate | Excellent | 3 sec. | 100% Fiber Tear | Excellent |
| 26 | 20 | — | Thiourea (60) | 10 | 10 | — | Moderate | Good | 1-3 sec. | 100% Fiber Tear | Excellent |
| 27 | 25 | — | Thiourea (75) | — | — | — | Very High | Poor | 1-3 sec. | 100% Fiber Tear | Excellent |
| 28 | 17 | — | Biuret (50) | — | 34 | — | High | Excellent | >4 sec. | <10% Fiber Tear | Poor |
| 29 | 17 | — | Diuret (50) | — | — | Glycerine (34) | Very High | Good | >4 sec. | <10% Fiber Tear | Poor |
| 30 | 25 | — | Biuret (75) | — | — | — | Heterogeneous | Poor | (Bonding Not Attempted) | | |
| 31 | 22 | — | Ammonium Formate (66) | — | 12 | — | Moderate | Good | >4 sec. | 10% Fiber Tear | Poor |
| 32 | 25 | — | Ammonium Formate (75) | — | — | — | Heterogeneous | Very Poor | (Bonding Not Attempted) | | |
| 33 | 9 | 48 | Acetamide (10) | 23 | 10 | — | Moderate | Excellent | 2-5 sec. | 100% Fiber Tear | Excellent |
| 34 | 19 | 48 | — | 23 | 20 | — | Moderate | Excellent | 3-6 sec. | 100% Fiber Tear | Excellent |
| 35 | 20 | 60 | — | — | 25 | — | Moderate | Excellent | 1-2 sec. | 100% Fiber Tear | Excellent |
| 36 | 19 | 56 | — | — | — | Ethylene Glycol (20) | Moderate | Good | 1-2 sec. | 100% Fiber Tear | Excellent |
| 37 | 20 | 60 | — | — | — | Ethylene Glycol (25) | Moderate | Good | 1-2 sec. | 100% Fiber Tear | Excellent |
| 38 | 19 | 56 | — | — | — | Diethylene Glycol (20) | Moderate | Good | 2-3 sec. | 100% Fiber Tear | Excellent |
| 39 | 20 | 60 | — | 23 | — | Triethylene Glycol (10) | Moderate | Excellent | 2-3 sec. | 100% Fiber Tear | Poor |
| 40 | 19 | 48 | — | — | — | Triethylene Glycol (20) | Moderate | Good | 3-6 sec. | 100% Fiber Tear | Fair-Good |
| 41 | 20 | 60 | — | — | — | Triethylene Glycol (25) | Moderate | Good | 2-3 sec. | 100% Fiber Tear | Fair |
| 42 | 19 | 56 | — | — | — | Cellosolve (25) | Moderately High | Good | 2-3 sec. | 100% Fiber Tear | Fair-Poor |
| 43 | 25 | 50 | — | — | — | Cellosolve (27) | Moderate | Good | 2-3 sec. | 100% Fiber Tear | Very Poor |
| 44 | 18 | 55 | — | — | — | Carbitol (25) | Moderately High | Good | 2-3 sec. | 100% Fiber Tear | Very Poor |
| 45 | 25 | 50 | — | — | — | Carbitol (27) | Moderate | Good | 1-2 sec. | 100% Fiber Tear | Very Poor |
| 46 | 18 | 55 | — | — | — | Butyl Cellosolve (25) | Moderately High | Fair | 2-3 sec. | 100% Fiber Tear | Very Poor |
| 47 | 25 | 50 | — | — | — | Butyl Cellosolve (27) | Moderate | Good | 2-4 sec. | 100% Fiber Tear | Very Poor |
| 48 | 18 | 55 | — | — | — | Carbitol Acetate (21) | Moderately High | Good | 2-3 sec. | 100% Fiber Tear | Very Poor |
| 49 | 20 | 50 | — | — | — | Carbitol Acetate (25) | Moderate | Good | 2-4 sec. | 100% Fiber Tear | Very Poor |
| 50 | 25 | 59 | — | — | — | Dimethyl Formamide (40) | Moderate | Poor | 2-5 sec. | 100% Fiber Tear | Poor |
| 51 | 20 | 40 | — | — | — | Dimethyl Formamide (50) | Moderate | Excellent | >4 sec. | Partial Fiber Tear | Poor |
| 52 | 25 | 25 | — | — | — | — | Moderate | Excellent | >4 sec. | Partial Fiber Tear | Poor |
| 53 | 33 | 33 | — | — | — | Dimethyl Formamide (33) | Very High | Fair | >1 min. | <10% Fiber Tear | Very Poor |
| 54 | 17 | 50 | — | — | — | Dimethyl Formamide (33) | Moderately High | Good | 2-5 sec. | 100% Fiber Tear | Poor |
| 55 | 14 | 43 | — | — | — | Dimethyl Formamide (43) | Moderate | Good | 2-5 sec. | 100% Fiber Tear | Poor |
| 56 | 20 | 40 | — | — | — | N-Methyl Pyrrolidone (40) | Moderate | Excellent | 2-4 sec. | 100% Fiber Tear | Poor |
| 57 | 25 | 25 | — | — | — | N-Methyl Pyrrolidone (50) | Moderate | Excellent | 1-3 sec. | 100% Fiber Tear | Poor |
| 58 | 33 | 33 | — | — | — | N-Methyl Pyrrolidone (33) | Very High | Fair | 3-6 sec. | 100% Fiber Tear | Poor |
| 59 | 20 | 60 | — | — | — | Dimethyl Sulfoxide (20) | Moderate | Excellent | 4-7 sec. | Partial Fiber Tear | Fair |
| 60 | 20 | 60 | — | — | — | Formamide (20) | Moderate | Excellent | 1-3 sec. | 100% Fiber Tear | Fair-Good |
| 61 | 20 | — | Pentaerythritol (60) | — | — | Dipropylene Glycol (20) | Moderate | Good | 1-3 sec. | 100% Fiber Tear | Fair |

[1] Viscosity designations: Moderate - 2000-3000 cps.; Moderately High - 3000-7300 cps.; High - 7500-10,000 cps.; Very High - Above 10,000 cps.
[2] Melt stability indicated as: Excellent - if little or no gassing observed and viscosity remains constant after several hours heating; Good - minor gassing, slow increase in viscosity with heating; Fair - moderate gassing and noticeable change in viscosity after 2 hr. heating; Poor - considerable gassing and the development of poor application properties after 1 hr. heating.
[3] Time required to obtain a fiber tearing bond.
[4] Tested by T-peel.
[5] Water resistance determined after a 24 hr. water soak of a 2-ply kraft laminate at ambient temperature and rated as follows: Excellent - bond still exhibited 100% fiber tear; Good - bond exhibited better than 50% fiber tear; Fair - only minor fiber tear observed; Poor - no fiber tear observed but sample did not delaminate; Very Poor - 100% delamination observed.

EXAMPLES 62-70

Molten homogeneous blend type adhesives based upon "Elvanol" 90-50 PVA and/or "EVAL" 80 E/VOH copolymer exhibiting excellent water resistance are illustrated in these examples.

A mixture of "Elvanol" 90-50 and/or "Eval" 80 (33/67 per weight E/VOH copolymer sold by Kurashiki), urea and propylene glycol was heated at about 135° C. with stirring for about ¼ to ½ hour until a homogeneous melt was obtained. The latter was then applied as a thin coating to one side of a 2 × 3 cm section of liner. A bond was produced by bringing a second section against this coating and cooling the resulting lap joint to room temperature. Finally the bonded structure was immersed in water, stored for 24 hours at ambient temperature and hand-pulled to test for delamination resistance as well as extent of bond failure by fiber tear. As will be noted in Table IV by observing the characteristics of compositions containing "Eval" 80 alone or combined with "Elvanol" 90-50, the presence of even relatively small amounts of "EVAL" 80 (e.g., 3-4%) conferred a high level of delamination resistance to the derived bonds even when a difficult-to-wet liner such as the resin sized product was used. Fiber tearing bonds were observed when the "EVAL" 80 level in the blend reached about 13%. Blends containing "EVAL" 80 are not fully repulpable and thus would be useful in the preparation of water-resistant corrugated board where repulpability was not required.

Bonds between sections of the same three types of liners prepared with a 20/60/20 "Elvanol" 90-50-/urea/propylene glycol composition underwent delamination in about 5 to 15 minutes in this test.

EXAMPLES 71-85

Molten homogeneous blend type adhesives based upon "Elvanol" T-25 and 71-30 PVA are compared with the same type of adhesives based upon "Elvanol" 95-50 PVA in these examples. "Elvanol" T-25 PVA has a degree of hydrolysis of at least about 99 percent, a 4 percent aqueous viscosity of 25-31 cps. at 20° C., and is available from E. I. du Pont de Nemours and Company. "Elvanol" 71-30 PVA has a degree of hydrolysis of 99.0-99.8 percent, a 4 percent aqueous viscosity of 28-32, and is available from E. I. du Pont de Nemours and Company. The blend compositions and their characteristics are summarized in Table V.

TABLE IV

| Example | Blend Composition, Wt. Ratio "Elvasol" 90-50 | "EVAL" 80 | Urea | Propylene Glycol | Conditions (RVT-SC4) PPM | Temp. (°C.) | Viscosity Average (cps.) | Heating Cycle (hr.) | Viscosity Increase/hr. cps. % | | Liner Type[1] | Water Resistance of Lap Joints After 24-Hr. Soak Delamination Resistance | Fiber Tear Degree | Est. % | No. of Joints Tested |
|---|---|---|---|---|---|---|---|---|---|---|---|---|---|---|---|
| 62 | 0 | 20 | 60 | 20 | 5-2.5 | 130 | 28,333 | 6 | 1333 | 4.7 | 90# Kraft | Very High | Very Strong | 100 | 3 |
| 63 | 0 | 16 | 64 | 20 | 50 | 130 | 1,992 | 5.25 | 62 | 3.1 | 90# Kraft | Very High | Weak-Moderate | 100 | 4 |
|  |  |  |  |  |  |  |  |  |  |  | 42# Weyerpak | Very High | Strong | 100 | 4 |
|  |  |  |  |  |  |  |  |  |  |  | 42# Resin-Sized | Very High | Moderate-Strong | 100 | 4 |
| 64 | 0 | 13 | 67 | 20 | 100 | 130 | 575 | 4.25 | 24 | 4.1 | 90# Kraft | Very High | Moderate | 60-20 | 4 |
|  |  |  |  |  |  |  |  |  |  |  | 42# Weyerpak | Very High | Weak-Moderate | 0-30 | 4 |
|  |  |  |  |  |  |  |  |  |  |  | 42# Resin-Sized | Very High | None-Weak | 0-25 | 4 |
| 65 | 0 | 10 | 70 | 20 | 100 | 130 | 215 | 4.5 | 9 | 4.4 | 90# Kraft | High-Very High | None-Very Weak | 0-10 | 4 |
|  |  |  |  |  |  |  |  |  |  |  | 42# Weyerpak | High | None | 0 | 4 |
|  |  |  |  |  |  |  |  |  |  |  | 42# Resin-Sized | High | None-Very Weak | 0-10 | 4 |
| 66 | 0 | 5 | 75 | 20 | (Estimated to be <100 cps. at 130° C.) |  |  |  |  |  | 90# Kraft | Moderate | None | 0 | 4 |
|  |  |  |  |  |  |  |  |  |  |  | 42# Weyerpak | Moderate-Moderately High | None | 0 | 4 |
|  |  |  |  |  |  |  |  |  |  |  | 42# Resin-Sized | Moderate | None | 0 | 4 |
| 67 | 10 | 10 | 60 | 20 |  |  | — |  |  |  | 90# Kraft | Moderate-Moderately High | None-Weak | 0-25 | 5 |
| 68 | 15 | 5 | 60 | 20 |  |  | — |  |  |  | 90# Kraft | High-Very High | None-Weak | 0-25 | 5 |
|  |  |  |  |  |  |  |  |  |  |  |  | None | None | 0 | 1 |
| 69 | 18 | 3 | 59 | 20 |  |  |  |  |  |  | 90# Kraft | High-Very High | None-Weak | 0-25 | 4 |
|  |  |  |  |  |  |  |  |  |  |  | 42# Weyerpak | High-Very High | None-Weak | 0-25 | 4 |
|  |  |  |  |  |  |  |  |  |  |  | 42# Resin-Sized | High-Very High | None | 0 | 2 |
| 70 | 16 | 4 | 60 | 20 | 20 | 130 | 8,021 | 7 | 545 | 6.8 | 90# Kraft | Very High | None-Weak | 0-25 | 4 |
|  |  |  |  |  |  |  |  |  |  |  | 42# Weyerpak | Very High | None | 0 | 2 |
|  |  |  |  |  |  |  |  |  |  |  | 42# Resin-Sized | None | None | 0 | 1 |

[1] Liners used:
90# Regular Kraft.
42# Weyerpak, a commercial Weyerhauser water-resistant product.
42# Resin-sized, an experimental Weyerhauser water-resistant, low porosity liner.

TABLE V

| Example | Blend Composition, Wt. Ratio | | | | | Blend Characteristics In Molten State | | | Bonding Performance To Kraft | |
|---|---|---|---|---|---|---|---|---|---|---|
| | "Elvanol" 90-50 | "Elvanol" T-25 | "Elvanol" 71-30 | Urea | Propylene Propylene Glycol | Viscosity[1] | Melt Stability[2] | Quick Tack[3] | Dry Bond[4] | Water Resistance[5] |
| 71 | — | 17 | — | 67 | 17 | Very High | Good | 1-2 sec. | 100% Fiber Tear | Good |
| 72 | 8.5 | 8.5 | — | 67 | 17 | High | Excellent | 1-2 sec. | 100% Fiber Tear | Good |
| 73 | — | — | 17 | 67 | 17 | Very High | Good | 1-2 sec. | 100% Fiber Tear | Excellent |
| 74 | 8.5 | — | 8.5 | 67 | 17 | Moderate | Excellent | 1-2 sec. | 100% Fiber Tear | Excellent |
| 75 | — | 19 | — | 56 | 25 | Very High | Excellent | 2-4 sec. | 100% Fiber Tear | Good |
| 76 | — | 20 | — | 60 | 20 | Very High | Excellent | 1-3 sec. | 100% Fiber Tear | Good |
| 77 | 9.5 | 9.5 | — | 56 | 25 | Very High | Excellent | 2-4 sec. | 100% Fiber Tear | Good |
| 78 | 10 | 10 | — | 60 | 20 | Very High | Excellent | 1-3 sec. | 100% Fiber Tear | Good |
| 79 | 10.5 | 10.5 | — | 64 | 15 | Very High | Good | 1-2 sec. | 100% Fiber Tear | Good |
| 80 | 9.5 | 9.5 | — | 56 | 25 | Very High | Good | 3-5 sec. | 100% Fiber Tear | Good |
| 81 | 10 | — | 10 | 60 | 20 | Very High | Good | 1-3 sec. | 100% Fiber Tear | Excellent |
| 82 | 10.5 | — | 10.5 | 64 | 15 | Very High | Good | 1-2 sec. | 100% Fiber Tear | Excellent |
| 83 | — | — | 19 | 56 | 25 | Very High | Good | 2-4 sec. | 100% Fiber Tear | Good |
| 84 | — | — | 20 | 60 | 20 | Very High | Good | 1-3 sec. | 100% Fiber Tear | Excellent |
| 85 | — | — | 21 | 64 | 15 | Very High | Good | 1-2 sec. | 100% Fiber Tear | Excellent |

[1] Viscosity designations: Moderate - 2000-5000 cps.; Moderately High - 5000-7500 cps.; High - 7500-10,000 cps.; Very High - Above 10,000 cps.
[2] Melt stability indicated as: Excellent - if little or no gassing observed and viscosity remains constant after several hours heating; Good - minor gassing, slow increase in viscosity with heating; Fair - moderate gassing and noticeable change in viscosity after 2 hr. heating; Poor - considerate gassing and the development of poor application properties after 1 hr. heating.
[3] Time required to obtain a fiber tearing bond.
[4] Tested by T-peel.
[5] Water resistance determined after a 24 hr. water soak of a 2-ply kraft laminate at ambient temperature and rated as follows: Excellent - bond still exhibited 100% fiber tear; Good - bond exhibited better than 50% fiber tear; Fair - only minor fiber tear observed; Poor - no fiber tear observed but sample did not delaminate; Very Poor - 100% delamination observed.

Examples 86 to 89 illustrate the viscous heterogeneous blend embodiment of the present invention.

EXAMPLE 86

Sixty grams of urea and 53 grams of water were added to a 0.25 liter stainless steel beaker heated in an electrical heating block and equipped with an air driven stirrer. When the temperature of the solution was 75° C., 20 grams of polyvinyl alcohol (Elvanol ® 90-50) was added at a uniform rate and stirring continued until a clear solution was obtained. Viscosity of this solution was 850 centipoise at 70° C. A comparable composition prepared without urea was a firm gel at 70° C. Forty-four grams of pigment grade calcium carbonate was stirred into the solution resulting in a heterogeneous blend containing 70% total solids. Viscosity of the blend was 1800 centipoise at 70° C., 2800 centipoise at 60° C. and 7500 centipoise at 50° C. measured with a Brookfield Viscometer, Model RVT, spindle #2 at 5 rpm.

EXAMPLE 87

A thin coating (about 1-2 mil) of the adhesive blend of Example 86 was applied to the tip (0.3 cm depth) of a 2.5 × 5.0 centimeter kraft paper coupon. A bond was produced by bringing a second coupon against this coating and allowing the lap joint (0.8 cm²) to set a room temperature. The bonded structure was immersed in water, under a 350 gram load (buoyancy-corrected), and stored for 24 hours at ambient temperature. After this exposure a fiber tearing bond was observed at ambient temperature but the adhesive coating was repulpable in 70° C. water.

EXAMPLE 88

Eighty one grams of ε-caprolactam and 91 grams of water were added to a 0.25 liter stainless steel beaker and heated as described in Example 86. When the solution was at 75° C., thirty grams of polyvinyl alcohol (Elvanol ® 90-50) was added and stirring continued until a clear solution resulted. Viscosity of this solution at 70° C. was 276 centipoises. A comparable composition prepared without ε-caprolactam was a firm gel at 70° C. One hundred and four grams of pigment grade calcium carbonate was stirred into this solution to make a tacky, heterogeneous blend containing 70 percent total solids. Brookfield viscosity of this blend was 1200 centipoises at 55° C.

EXAMPLE 89

A bonded structure was prepared with the adhesive blend of Example 88 by the process described in Example 87 with the exception of drying the bonded joint under an infrared heat lamp at a surface temperature of 100° C. for five minutes. The bonded structure was immersed in water as described in Example 87. After 24 hours a fiber tearing bond was observed at ambient temperature but the adhesive coating was repulpable in 70° C. water.

Examples 90 to 93 illustrate the low viscosity, stable suspension embodiment of the present invention.

EXAMPLES 90 to 93

Post heat activatable PVA based adhesive suspensions were prepared by dissolving urea in water, adding guar gum as a suspending agent, then dispersing a heat treated guide of polyvinyl alcohol, prepared as described in Bristol USP 3,654,247, to the solution. Adhesive compositions prepared by this method are summarized in Table VI.

A thin coating of each of the suspension described in Table VI was applied to the tip (0.3 cm depth) of a 2.5 × 5.0 centimeter kraft paper coupon and set aside to dry. A bond was produced by bringing a second uncoated coupon against this dried coating and heating the overlaped section in a Sentinel Heat Sealer for 7 seconds at 14 psi clamp pressure with a bar temperature of 190° C. The resultant bonded structures were immersed in water as described in Example 87. After 24 hours exposure under these conditions a fiber tearing bond was observed but the adhesive coating was repulpable in 70° C. water.

TABLE VI

| | Blend Composition (wt. ratio) | | | | |
|---|---|---|---|---|---|
| Example | PVA | Urea | Water | "Jaguar" A 40-F | Solids (%) |
| 90 | 10 | 20 | 120 | 0.20 | 20 |

TABLE VI-continued

| | Blend Composition (wt. ratio) | | | | |
|---|---|---|---|---|---|
| Example | PVA | Urea | Water | "Jaguar" A 40-F | Solids (%) |
| 91 | 20 | 40 | 26 | 0.06 | 70 |
| 92 | 10 | 70 | 320 | 0.30 | 20 |
| 93 | 10 | 60 | 46 | 0.10 | 60 |

I claim:

1. An adhesive composition consisting essentially of (1) about 2 to 35 percent by weight of a polymer selected from the group consisting of polyvinyl alcohol and ethylene/vinyl alcohol copolymers containing at least 50 mol percent vinyl alcohol, (2) about 10 to 80 percent by weight of at least one solvent for said polymer, which solvent is crystalline at 40° C. and is selected from the group consisting of urea, solid alkyl substituted ureas containing a total of up to 9 carbon atoms, thiourea, biuret, ε-caprolactam, solid aliphatic amides containing up to 6 carbon atoms, solid polyhydric compounds and ammonium carboxylate salts, (3) about 5 to 80 percent by weight of at least one viscosity reducing diluent selected from the group consisting of water, liquid polyhydric compounds, liquid alkyl substituted ureas having up to 9 carbon atoms in the alkyl group, liquid aliphatic amides containing up to 6 carbon atoms, and dimethyl sulfoxide, and (4) 0 to about 60 percent by weight extender selected from the group consisting of starch, dextrin, clay, silica, carbon black, talc, calcium carbonate, barium sulfate and vinyl polymer latices, provided that when said adhesive composition is a suspension the polymer is polyvinyl alcohol which has a cold water solubles content of less than 10 percent by weight at 25° C. while being soluble in 80° C.–100° C. water.

2. The composition of claim 1 wherein said adhesive composition is a homogeneous system consisting essentially of about 10 to 35 percent by weight of a polymer selected from the group consisting of polyvinyl alcohol and ethylene/vinyl alcohol copolymers containing at least 50 mol percent vinyl alcohol, about 40 to 80 percent by weight of at least one crystalline solvent for said polymer, and about 5 to 45 percent by weight of at least one viscosity reducing diluent.

3. The composition of claim 2 wherein said crystalline solvent for the polymer is selected from the group consisting of urea, solid alkyl substituted ureas containing a total of up to 9 carbon atoms, thiourea, biuret, ε-caprolactam, solid aliphatic amides containing up to 6 carbon atoms, pentaerythritol, sorbitol, mannitol and tris(hydroxymethyl) aminomethane, and ammonium carboxylate salts.

4. The composition of claim 3 wherein said crystalline solvent for the polymer is urea, or ε-caprolactam.

5. The composition of claim 4 wherein said crystalline solvent for the polymer is urea.

6. The composition of claim 3 wherein said polyvinyl alcohol is at least 99 percent hydrolyzed and has a 4 percent aqueous viscosity at 20° C. of from about 10 to about 65 centipoises.

7. The composition of claim 6 wherein said polyvinyl alcohol has a 4 percent aqueous viscosity at 20° C. of from about 12 to about 14 centipoises.

8. The composition of claim 6 wherein said polyvinyl alcohol has a 4 percent aqueous viscosity at 20° C. of from about 25 to about 31 centipoises.

9. The composition of claim 6 wherein said polyvinyl alcohol has a degree of hydrolysis of from about 99.0 to about 99.8 percent and a 4 percent aqueous viscosity at 20° C. of from about 28 to about 32 centipoises.

10. The composition of claim 3 wherein said viscosity reducing diluent is selected from the group consisting of water, liquid glycols, liquid glycol ethers wherein the alkyl group contains 1 to 4 carbon atoms, liquid glycol esters wherein the acyl group contains 2 to 4 carbon atoms, liquid polyalkylene oxides having a molecular weight of up to about 1000, their liquid alkyl ethers wherein the alkyl group contains 1 to 4 carbon atoms, their liquid esters wherein the acyl group contains 2 to 4 carbon atoms, liquid alkyl substituted ureas having up to 9 carbon atoms in the alkyl group, liquid aliphatic amides containing up to 6 carbon atoms, and dimethyl sulfoxide.

11. The composition of claim 10 wherein said viscosity reducing diluent is selected from the group consisting of water and liquid glycols having 2 to 9 carbon atoms.

12. The composition of claim 10 wherein said viscosity reducing diluent is selected from the group consisting of water, ethylene glycol, propylene glycol, diethylene glycol, dipropylene glycol, triethylene glycol, dimethyl sulfoxide, and formamide.

13. The composition of claim 3 containing about 1 to 5 percent by weight, based upon adhesive solids, of a wetting agent selected from the group consisting of sodium lauryl sulfate, polyethylene oxide-alkyl phenol adducts and their phosphate ethers, quaternary ammonium salts, alkali phosphates and sodium nitrilotriacetate.

14. A curable homogeneous adhesive composition consisting essentially of the composition of claim 3 and a curing agent selected from the group consisting of (a) about 2 percent titanium citrate and about 2 to 4 percent glycollic or citric acid, based upon the weight of the adhesive, and (b) about 1 to 20 percent, based upon the weight of the adhesive, of a resole prepared by heating for about 15 minutes at about 90° C. to 95° C. about 1 part by weight of resorcinol, about 1 part by weight of urea and about 1 to 3 parts by weight of 37 percent formalin, provided that curing agent (b) is employed only in adhesives wherein the viscosity reducing diluent is water.

15. The composition of claim 3 containing in addition up to about 10 percent by weight of at least one extender selected from the group consisting essentially of starch, dextrin, clay, silica, carbon black, talc, calcium carbonate, barium sulfate and vinyl polymer latices.

16. A structure comprising at least two cellulosic substrates bonded together by means of the homogeneous adhesive composition of claim 3.

17. The structure of claim 16 wherein the crystalline solvent for the polymer is urea or ε-caprolactam.

18. The composition of claim 1 wherein said adhesive composition is a heterogeneous system consisting essentially of about 5 to 25 percent by weight of a polymer selected from the group consisting of polyvinyl alcohol and ethylene/vinyl alcohol copolymers containing at least 50 mol percent vinyl alcohol, about 10 to 45 percent by weight of at least one crystalline solvent for said polymer, and about 20 to 40 percent by weight of at least one viscosity reducing diluent, and about 5 to 60 percent by weight extender.

19. The composition of claim 18 wherein said crystalline solvent for the polymer is selected from the group consisting of urea, solid alkyl substituted ureas containing a total of up to 9 carbon atoms, thiourea, biuret, ε-caprolactam, solid aliphatic amides containing up to 6 carbon atoms, pentaerythritol, sorbitol, mannitol and tris(hydroxymethyl) aminomethane, and ammonium carboxylate salts.

20. The composition of claim 19 wherein said crystalline solvent for the polymer is urea, or ε-caprolactam.

21. The composition of claim 20 wherein said crystalline solvent for the polymer is urea.

22. The composition of claim 19 wherein said polyvinyl alcohol is at least 99 percent hydrolyzed and has a 4 percent aqueous viscosity at 20° C. of from about 10 to about 65 centipoises.

23. The composition of claim 20 wherein said polyvinyl alcohol has a 4 percent aqueous viscosity at 20° C. of from about 12 to about 14 centipoises.

24. The composition of claim 20 wherein said polyvinyl alcohol has a 4 percent aqueous viscosity at 20° C. of from about 25 to about 31 centipoises.

25. The composition of claim 20 wherein said polyvinyl alcohol has a degree of hydrolysis of from about 99.0 to about 99.8 percent and a 4 percent aqueous viscosity at 20° C. of from about 28 to about 32 centipoises.

26. The composition of claim 19 wherein said viscosity reducing diluent is selected from the group consisting of water, liquid glycols, liquid glycol ethers wherein the alkyl group contains 1 to 4 carbon atoms, liquid glycol esters wherein the acyl group contains 2 to 4 carbon atoms, liquid polyalkylene oxides having a molecular weight of up to about 1000, their liquid alkyl ethers wherein the alkyl group contains 1 to 4 carbon atoms, their liquid esters wherein the acyl group contains 2 to 4 carbon atoms, liquid alkyl substituted ureas having up to 9 carbon atoms in the alkyl group, liquid aliphatic amides containing up to 6 carbon atoms, and dimethyl sulfoxide.

27. The composition of claim 26 wherein said viscosity reducing diluent is selected from the group consisting of water, ethylene glycol, propylene glycol, diethylene glycol, dipropylene glycol, triethylene glycol, dimethyl sulfoxide, and formamide.

28. The composition of claim 27 wherein said viscosity reducing diluent is water.

29. A structure comprising at least two cellulosic substrates bonded together by means of the heterogeneous adhesive composition of claim 19.

30. The structure of claim 29 wherein the crystalline solvent for the polymer is urea or ε-caprolactam.

31. The composition of claim 1 wherein said adhesive composition is a suspension consisting essentially of about 2 to 35 percent by weight of polyvinyl alcohol, said polyvinyl alcohol having a cold water solubles content of less than 10 percent by weight at 25° C. while being soluble in 80° C.–100° C. water; about 15 to 68 percent by weight of at least one crystalline solvent for said polymer; and about 30 to 80 percent by weight of at least one viscosity reducing diluent.

32. The composition of claim 31 wherein said crystalline solvent for the polymer is selected from the group consisting of urea, solid alkyl subsyituted ureas containing a total of up to 9 carbon atoms, thiourea, biuret, ε-caprolactam, solid aliphatic amides containing up to 6 carbon atoms, pentaerythritol, sorbitol, mannitol and tris(hydroxymethyl) aminomethane, and ammonium carboxylate salts.

33. The composition of claim 32 wherein said crystalline solvent for the polymer is urea or ε-caprolactam.

34. The composition of claim 33 wherein said crystalline solvent for the polymer is urea.

35. The composition of claim 32 wherein said polyvinyl alcohol is at least 99 percent hydrolyzed and has a 4 percent aqueous viscosity at 20° C. of from about 10 to about 65 centipoises.

36. The composition of claim 35 wherein said polyvinyl alcohol has a 4 percent aqueous viscosity at 20° C. of from about 12 to about 14 centipoises.

37. The composition of claim 35 wherein said polyvinyl alcohol has a 4 percent aqueous viscosity at 20° C. of from about 25 to about 31 centipoises.

38. The composition of claim 35 wherein said polyvinyl alcohol has a degree of hydrolysis of from about 99.0 to about 99.8 percent and a 4 percent aqueous viscosity at 20° C. of from about 28 to about 32 centipoises.

39. The composition of claim 32 wherein said viscosity reducing diluent is selected from the group consisting of water, liquid glycols, liquid glycol ethers wherein the alkyl group contains 1 to 4 carbon atoms, liquid glycol esters wherein the acyl group contains 2 to 4 carbon atoms, liquid polyalkylene oxides having a molecular weight of up to about 1000, their liquid alkyl ethers wherein the alkyl group contains 1 to 4 carbon atoms, their liquid esters wherein the acyl group contains 2 to 4 carbon atoms, liquid alkyl substituted ureas having up to 9 carbon atoms in the alkyl group, liquid aliphatic amides containing up to 6 carbon atoms, and dimethyl sulfoxide.

40. The composition of claim 39 wherein said viscosity reducing diluent is selected from the group consisting of water, ethylene glycol, propylene glycol, diethylene glycol, dipropylene glycol, triethylene glycol, dimethyl sulfoxide, and formamide.

41. The composition of claim 40 wherein said viscosity reducing diluent is water.

42. The composition of claim 33 containing about 0.05 to 0.5 percent by weight guar gum.

43. The composition of claim 41 containing about 0.1 to 0.3 percent by weight guar gum.

44. A structure comprising at least two cellulosic substrates bonded together by means of the adhesive composition of claim 32.

45. The structure of claim 44 wherein the crystalline solvent for the polymer is urea or ε-caprolactam.

* * * * *